United States Patent [19]

Cietek et al.

[11] Patent Number: 4,719,194

[45] Date of Patent: Jan. 12, 1988

[54] SELF-EMULSIFIABLE PAPER RELEASE CATALYST BLEND

[75] Inventors: Timothy J. Cietek, Clifton Park; Frank J. Traver, Troy, both of N.Y.

[73] Assignee: General Electric Company, Waterford, N.Y.

[21] Appl. No.: 53,552

[22] Filed: May 21, 1987

Related U.S. Application Data

[63] Continuation of Ser. No. 634,445, Jul. 25, 1984, abandoned, which is a continuation of Ser. No. 356,797, Mar. 10, 1982, abandoned.

[51] Int. Cl.$^4$ .............. B01J 31/12; C08G 77/08; C08L 83/04
[52] U.S. Cl. .................. 502/155; 252/356; 427/387; 427/411; 502/152; 502/158; 502/168; 524/837; 525/100; 528/18
[58] Field of Search ............. 502/152, 155, 158, 168, 502/170, 156; 252/354, 356; 427/387, 411; 524/837; 528/18

[56] References Cited

U.S. PATENT DOCUMENTS

| | | | |
|---|---|---|---|
| 2,854,424 | 9/1958 | Solomon et al. | 524/837 |
| 3,194,770 | 7/1965 | Hostettler | 252/431 R |
| 3,499,870 | 3/1970 | Hadlock et al. | 528/32 |
| 3,767,602 | 10/1973 | Carrol et al. | 260/2.5 |
| 3,925,242 | 12/1975 | Sagi et al. | 252/356 |
| 3,975,294 | 4/1976 | Dumoulin | 252/354 |
| 4,370,385 | 1/1983 | Yoshida et al. | 427/387 |
| 4,426,490 | 1/1984 | Dallavia, Jr. et al. | 524/837 |

FOREIGN PATENT DOCUMENTS 2427039  12/1974  Fed. Rep. of Germany ........ 528/18

*Primary Examiner*—Paul E. Konopka
*Attorney, Agent, or Firm*—G. L. Loser; J. W. Harbour

[57] ABSTRACT

Paper release catalyst blends which are self-emulsifiable and form uniquely stable catalyst emulsions are disclosed. The blends, comprising compatible emulsifiers and organo tin catalysts, disperse in aqueous baths without colloidal milling and retain activity in storage longer than conventional catalyst emulsions.

2 Claims, No Drawings

SELF-EMULSIFIABLE PAPER RELEASE CATALYST BLEND

This is a continuation of application Ser. No. 634,445, filed July 25, 1984, now abandoned, which is a continuation of application Ser. No. 356,797, filed Mar. 10, 1982 and now abandoned.

This invention relates to catalyst emulsions for use in silicone paper release coating compositions. More particularly, it relates to blends of emulsifiers and organotin catalysts which are self-dispersible in aqueous solutions and thus can be added to silicone paper release coating baths without pre-emulsification.

BACKGROUND OF THE INVENTION

Silicone compositions have long been used as release coatings, which render surfaces or materials comparatively nonadherent to other materials which would ordinarily adhere thereto. Silicone release compositions are widely used as coatings which release pressure-sensitive adhesives on labels, decorative laminates, transfer tapes, etc. Silicone release coatings on paper, polyethylene, Mylar ®, and other such substrates are also employed to provide non-stick surfaces for food handling and industrial packaging applications.

Silicone paper release coatings are effeciently applied from an aqueous bath containing the emulsified silicone coating composition and a catalyst emulsion. Once coated, the paper or other substrate is exposed to heat in order to cure the coating.

Silanol-containing paper release compositions are catalyzed by organo tin compounds, as disclosed in U.S. Pat. No. 3,499,870 (Hadlock et al.), and extensive work has been performed in achieving the optimal combination of properties in these catalysts. See, e.g., U.S. application Ser. No. 356,796 filed Mar. 10, 1982, now U.S. Pat. No. 4,426,490 and commonly assigned.

Catalysts prepared for use in water base systems must be emulsified with such conventional emulsifiers as polyvinyl alcohol. A drawback to these catalyst emulsions has been that they can separate with time on storage, or they can break with exposure to temperature extremes, i.e., below about $-15°$ C. or about $50°$ C. Some tin compounds may also undergo hydrolysis during prolonged storage and revert to catalytically inactive form.

It has now been discovered that these drawbacks can be overcome by novel blends including an emulsifier and an organo tin catalyst which are self-emulsifiable (i.e., water dispersible) and so can be added to paper release coating baths without pre-emulsification. The blends form uniquely stable catalyst emulsions which remain active longer when stored in emulsion form than known catalyst emulsions.

SUMMARY OF THE INVENTION

Accordingly, it is an object of the present invention to provide novel organo tin catalyst/emulsifier blends which are self-dispersible in aqueous systems.

It is a further object of the present invention to provide catalyst emulsions which will remain catalytically active during prolonged shelf storage.

These and other objects are accomplished herein by a catalyst blend including:

(A) 13 to 50 parts by weight of an emulsifier, and (B) 87 to 50 parts by weight of an organo tin catalyst of the formula $R_2SnQ_2$, wherein R is $C_1$-$C_8$ alkyl and Q is selected from

—SR', or

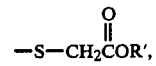

where R' is a monovalent hydrocarbon radical of from 1 to 18 carbon atoms; said components (A) and (B) being mutually soluble and said blend being water dispersible.

DETAILED DESCRIPTION OF THE INVENTION

The self-emulsifiable catalyst blends of the present invention are prepared by emulsifying an organo tin catalyst with a compatible emulsifier so that a stable emulsion which is readily dispersible in aqueous systems is formed. Such catalyst emulsions are easier to use than catalysts requiring emulsification steps, such as colloidal milling, when introduced to water based systems such as paper release coating baths. They also remain catalytically active and in emulsion form during prolonged storage.

The typical catalyst emulsion blend of the present invention is composed of at least two components: an emulsifier, and an organo tin compound capable of catalyzing cross-linking in organosilicon polymer compositions, such as SiOH-containing paper release coating compositions.

Emulsifiers which are suitable for the purposes herein include any one of a number of organic compounds which is mutually soluble with at least one organo tin catalyst and which will render the catalyst readily dispersible in water without interfering with its catalytic activity in relation to organosilicon polymers. Emulsifiers already found which exhibit these properties include:

polyoxyethylene 20 sorbitan monooleate
polyoxyethylene 20 sorbitan mono stearate
polyoxyethylene 20 sorbitan trioleate
alkylphenoxypoly (ethyleneoxy) ethanol
polyoxyethylene 5 sorbitan monooleate
polyethylene glycol 400 monooleate
polyoxyethylene 4 ether lauryl alcohol
polyoxyethylene 10 oleyl ether p0 polyoxyethylene 10 cetyl ether Polyoxyethylene 20 sorbitan trioleate and polyoxyethylene 20 sorbitan mono stearate are preferred. Simple experimentation will yield other suitable emulsifiers for a given tin catalyst and are intended to be included within the scope of this invention. Combinations of emulsifiers may also be used.

Suitable organo tin catalysts for the present invention will have the general formula $R_2SnQ_2$, wherein R is an alkyl radical of 1 to 8 carbons and Q is carboxylate $$(-OCR'),$$
$$\overset{\|}{O}$$

mercaptide (—SR'), or thioacetic acid ester $$(-S-CH_2\overset{\|}{\underset{O}{C}}-O-R'),$$

where R' is a monovalent hydrocarbon radical of from 1 to 18 carbon atoms. Commercially obtainable such compounds include but are not limited to Witco Formez® UL-1 (dibutyl tin mercaptide)

Witco Formez® UL-6 (dibutyl tin dithioacetic acid ester)

Witco Formez® UL-28 (dimethyl tin dineodeconate).

Witco Fomrez® UL-24 (dimethyl tin S,S'-bis(isooctyl mercapto acetate) and

Witco Fomrez® UL-29 (di(n-octyl) tin S,S'-bis(isooctyl mercapto acetate)

M&T Thermolite® 831 [abbreviated T-831 hereinafter] (di(n-octyl) tin S,S,' bis(isooctyl mercapto acetate)

M&T Catalyst 20 (diorgano tin mercaptide, 17.5% tin)

The wide structural variety of catalysts which may be suitable for the self-emulsifiable catalyst blends of the present invention is a special advantage in that there is great flexibility in the class of tin catalysts that can be employed, and those skilled in the art may tailor a catalyst emulsion for their specific needs.

A further advantage of the present blends is that the tin catalyst content is upwards of 50%, which gives much higher solids content than conventional catalyst emulsions, which typically contain 20-33% tin catalyst.

In order that those skilled in the art may better understand how to practice the present invention, the following examples are provided by way of illustration, and not by way of limitation.

The following is a description of the catalysts and emulsifiers used in the formulations of the examples; the tradenames will be used hereinafter for brevity:

General Electric SM-2057, a silicone emulsion containing approximately 40% silanol-stopped polydimethylsiloxane fluids and a polyvinyl alcohol emulsifier.

Kelgin MV, medium viscosity (MV) hydrophilic derivative of algin (sodium alginate).

Hodag PSMO-20, polyoxyethylene sorbitan monooleate, nonionic emulsifier, HLB 15.0.

PSML-20, polyoxyethylene sorbitan monolurate, nonionic emulsifier, HLB 16.7.

Tween 80 (ICI Americas Inc.), polyoxyethylene (20) sorbitan monooleate, nonionic emulsifier, HLB 15.0.

Tween 81, polyoxyethylene (5) sorbitan monooleate, nonionic emulsifier, HLB 10.0.

Tween 85, polyoxyethylene (20) sorbitan trioleate (polysorbate 85), nonionic emulsifier, HLB 11.0.

Witconol H-31A (Witco Chemical Corp.), polyethylene glycol (400) monooleate nonionic oil-in-water emulsifier.

Witconol NP-40, ethoxylated nonylphenol (4 molar) emulsifier.

Witconol NP-80, ethoxylated nonylphenol (8 molar) emulsifier.

Glycosperse P-20 (Glyco Chemical, Inc.), polyoxyethylene (20) sorbitan monopalmitate emulsifier, HLB 15.6.

Glycosperse S-20, polyoxyethylene (20) sorbitan monostearate emulsifier, HLB 14.9.

Glycosperse O-20, polyoxyethylene (20) sorbitan monooleate emulsifier, HLB 15.0.

Glycosperse L-20, polyoxyethylene (20) sorbitan monolaurate emulsifier, HLB 16.7.

T-Maz-20 (Mazer Chemicals, Inc.), polyoxyethylene (20) sorbitan monolaurate, nonionic emulsifier, HLB 16.7.

Sorbax PMO-20 (Chemax, Inc.), polyoxyethylene (20) sorbitan monooleate, nonionic emulsifier.

Pegosperse 400 MOT (Glyco Chemical, Inc.), polyethylene Glycol (400) monotallate, nonionic emulsifier, HLB 11.0.

Aldo MOD (Glyco Chemicals, Inc.), glycerol monooleate (dispersible), nonionic emulsifier, HLB 5.6.

Ethosperse G-26 (Glyco Chemicals, Inc.), polyoxyethylene (26) ether of glycerine, HLB 18.4.

Ethosperse LA-4, polyoxyethylene (4) ether of lauryl alcohol, HLB 9.5.

Ethosperse SL-20, polyoxyethylene (20) ether of sorbitol, HLB 16.6.

Ethofat 242/25, (Armak Industrial Chemicals Division), ethylene oxide condensate of fatty acids, nonionic emulsifier.

Brij 56 (ICI Americas, Inc.), polyoxyethylene (10) cetyl ether, nonionic emulsifier, HLB 12.9.

Brij 93, polyoxyethylene (2) oleyl ether, nonionic emulsifier, HLB 4.9.

Brij 96, polyoxyethylene (10) oleyl ether, nonionic emulsifier, HLB 12.4.

Brij 98, polyoxyethylene (20) oleyl ether, nonionic emulsifier, HLB 15.3.

Nonionic E-4 (Hodag Chemical Corp.), nonyl phenoxy poly(ethyleneoxy) ethanol, nonionic wetting agent (4 moles etheyleneoxide), HLB 8.6.

Nonionic E-6, nonyl phenoxy polyethyleneoxy ethanol, nonionic wetting agent (6 moles ethylene oxide), HLB 10.6.

Nonionic E-10, nonyl phenoxy polyethyleneoxy ethanol, nonionic wetting agent (10 moles ethylenoxide), HLB 12.6.

Tetronic 304 & 702 (BASF Wyandotte Industrial Chemicals Group), two of a serires of compounds formed by addition of propylene oxide of ethylene diamine, followed by the addition of ethylene oxide; nonionic wetting agents, HLB 17.0 & 7.0, respectively.

Plurafac A-24 (BASF), oxyethylated straight-chain alcohol, nonionic emulsifier.

Plurafac D-25, modified oxyethylated straight-chain alcohol, nonionic emulsifier, HLB 11.0.

Pluronic L-35, L-42 & L-61 (BASF), three Liquid Emulsifiers in a series of condensates of ethylene oxide with hydrophobic bases formed by condensing propylene oxide with propylene glycol, nonionic, HLB 8.0, 12.0 & 7.0, respectively.

Pluronic 17R2 & 17R4, two dispersants in a series of condensates of propylene oxide with hydrophilic bases formed by condensing ethylene oxide with ethylene glycol, liquid nonionic additives.

Arlamol E (Atlas Chemical Industries), fatty acid propoxylate, liquid nonionic emollient.

Mazol PGO-31 (Mazer Chemicals, Inc.), triglycerol monooleate polyol, HLB 6.2.

Mazol PGO-104, decaglycerol tetraoleate, HLB 6.2.

EXAMPLES 1-3

A silanol-containing paper release coating bath was prepared using the following ingredients:

| Ingredient | Parts by Weight |
|---|---|
| silicone release emulsion (General Electric SM-2057) | 20 parts by weight |
| catalyst emulsion (A) polyoxyethylene 20 sorbitan monooleate (B) 82.9% di(n-octyl) tin S,S' bis(isooctyl) mercapto acetate) | 4 parts by weight |
| Kelgin MV solution (1% Kelgin MV) | 50 parts by weight |
| water | 26 parts by weight |

The catalyst emulsion was transparent and was readily dispersed when added to the aqueous release emulsion and gently shaken. Mechanical energy as supplied by colloid milling was unnecessary to produce an emulsion.

The coating bath solution was coated on Riegal 42-pound bleached Kraft paper at 0.5 pounds per ream with the following results:

| Release Value at 12 in/min. (Johnson & Johnson Tape) | |
|---|---|
| Initial (20 hrs.) | 1 week aged |
| 5-11 gr./in. | 6-14 gr./in. |

The above experiment was repeated using a 25% and 50% levels of the emulsifier, polyoxyethylene 20 sorbitan monooleate, with comparable results. It was observed with the above catalyst blends that there was no smear or rub-off after one-hour conditioning of the coated sheet at room temperature and 50% relative humidity. Subsequent adhesion of the tape was found to be 70-90%, which compares to standard commercial paper release systems.

EXAMPLES 4-6

Several emulsifiers were tested for self-emulsification with a single catalyst, Thermolite ® 831, i.e., di(n-octyl) tin S,S' bis(isooctyl mercapto acetate), abbreviated T-831.

| Sample | Composition | Solubility |
|---|---|---|
| 4 | 25% Nalco ® non-ionic ethoxylated alkylphenol, HLB 9, in T-831 | soluble |
| # | 25% Nalco ® non-ionic polyoxyethylated vegetable oil, HLB 14+, in T-831 | not soluble |
| 5 | 25% Nalco ® non-ionic ethoxylated alkylphenol, HLB 14, in T-831 | soluble |
| 6 | 25% Nalco ® non-ionic ethoxylated alkylphenol, HLB 10-11, in T-831 | soluble |

| | Self-Emulsification | | |
|---|---|---|---|
| Sample | Initial | After 20 Hrs. | Freeze-Thaw (16 Hrs. at −15° C.) |
| 4 | emulsified | broke rapidly | no haze or ppt. |
| 5 | " | some separation | frozen |
| 6 | " | no separation | no haze or ppt. |

Of the three compositions which were initially self-emulsifiable, Sample 6 is seen to have the most stable emulsion, lasting >20 hours without separation and showing no haze or precipitation after freeze-thaw testing.

EXAMPLES 7-9 AND COMPARATIVE TRIALS

A wide variety of catalyst-emulsifier combinations were tested for compatibility [emulsifiers and catalysts identified by tradename]:

[See Table A]

TABLE A

| Sample | Sn Catalyst | Amount | Emulsifier | Amount | Comments |
|---|---|---|---|---|---|
| A. | Witco UL 1 | 24 parts/wt. | Hodag PSMO-20 | 6 parts/wt. | not soluble haze |
| B. | Witco UL 6 | 24 parts/wt. | Hodag PSMO-20 | 6 parts/wt. | not soluble haze |
| C. | Catalyst 120 | 24 parts/wt. | Hodag PSMO-20 | 6 parts/wt. | not soluble haze |
| 7. | Catalyst 120 | 3 parts/wt. | Tween 85 | 1 parts/wt. | soluble |
| 8. | Catalyst 120 | 3 parts/wt. | Witconal H31A | 1 parts/wt. | soluble |
| F. | Catalyst 120 | 3 parts/wt. | Glycosperse 520 | 1 parts/wt. | not soluble haze (S) |
| G. | Catalyst 120 | 3 parts/wt. | Glycosperse O.20 | 1 parts/wt. | not soluble haze (S) |
| 9. | Catalyst 120 | 3 parts/wt. | Tween 85 / Witconal H31A | ½ parts/wt. / ½ parts/wt. | soluble / — |
| I. | Witco UL-6 | 3 parts/wt. | Tween 85 | 1 parts/wt. | soluble |
| J. | Witco UL-6 | 3 parts/wt. | Glycosperse O20 | 1 parts/wt. | soluble |
| K. | Witco UL-6 | 3 parts/wt. | Glycosperse S20 | 1 parts/wt. | soluble |
| L. | Witco UL-6 | 3 parts/wt. | Witconal H31A | 1 parts/wt. | soluble |
| M. | Witco UL-24 | 3 parts/wt. | Tween 85 | 1 parts/wt. | soluble |
| N. | Witco UL-29 | 3 parts/wt. | Glycosperse S20 | 1 parts/wt. | soluble |
| O. | Witco UL-29 | 3 parts/wt. | Glycosperse S20 | 1 parts/wt. | soluble |
| P. | Witco UL-29 | 3 parts/wt. | Witconal H31A | 1 parts/wt. | soluble |
| Q. | Catalyst T-831 | 7½ parts/wt. | TMAZ-20 | 2½ parts/wt. | not soluble |
| R. | Catalyst T-831 | 7½ parts/wt. | Glycosperse S20 | 2½ parts/wt. | soluble |
| S. | Catalyst T-831 | 7½ parts/wt. | Glycosperse L20 | 2½ parts/wt. | (S) |
| T. | Catalyst T-831 | 7½ parts/wt. | Glycosperse O20 | 2½ parts/wt. | soluble |
| U. | Catalyst T-831 | 7½ parts/wt. | Hodag PSMO-20 | 2½ parts/wt. | (S) |
| V. | Catalyst T-831 | 7½ parts/wt. | Hodag PSMO-20 | 2½ parts/wt. | (S) |
| W. | Catalyst T-831 | 7½ parts/wt. | Tween 80 | 2½ parts/wt. | soluble |
| X. | Catalyst T-831 | 7½ parts/wt. | Tween 85 | 2½ parts/wt. | soluble |
| Y. | Catalyst T-831 | 7½ parts/wt. | Sortux PMO-20 | 2½ parts/wt. | (S) |
| Z. | Catalyst T-831 | 7½ parts/wt. | Witconal H31A | 2½ parts/wt. | soluble |
| AA. | Catalyst T-831 | 7½ parts/wt. | Tween 81 | 2½ parts/wt. | haze |
| AB. | Catalyst T-831 | 7½ parts/wt. | Pegosperse 400 | 2½ parts/wt. | not soluble |
| AC. | Catalyst T-831 | 7½ parts/wt. | MOT Aldo MOD | 2½ parts/wt. | (S) |
| AD. | Catalyst T-831 | 7½ parts/wt. | Ethosperse G-26 | 2½ parts/wt. | (S) |

(S) = separated on standing at room temperature.

The combinations which were mutually soluble in the above trials were tested for freeze-thaw stability of the emulsion and water dispersability. The following results were observed:

| Sample | Freeze-Thaw Results (16 hrs below −15° C.) | Self-Emulsifiable Results |
|---|---|---|
| 7. | Clear | initial & 16 hrs. |
| 8. | Haze | initial & 16 hrs. |
| 9. | | initial & 16 hrs. |
| I. | Clear | |
| J. | Haze | |
| K. | Slight Haze | |
| L. | Haze | |
| M. | Clear | |
| N. | Haze & Slight Separation | |
| O. | Slight Haze | |
| P. | Haze | |
| R. | Haze | |
| T. | Slight Haze | |
| W. | Clear | |
| X. | Clear | |
| Z. | Haze | |

Samples 7, 8 and 9 were the samples that were self-emulsifiable for this invention.

EXAMPLES 10–17 AND COMPARATIVE TRIALS

A large number of emulsifiers were tested for compatability with a single catalyst, Catalyst 120 ® (M & T Chemicals, Inc.), an organo tin mercaptide containing 17.5% by weight tin. All emulsifiers were added to 25% by weight of the emulsifier/Catalyst 120 blend [emulsifiers identified by tradename].

| Sample | Emulsifier | >Catalyst< Solubility at r.t. | Water Dispersible |
|---|---|---|---|
| 10 | Brij 93 | soluble | initially, then separated |
| BB | Brij 98 | haze | |
| 11 | Nonionic L-4 | soluble | initially |
| BD | Nonionic E-6 | haze | |
| BE | Nonionic E-10 | haze | |
| 12 | Ethosperse LA-4 | soluble | initially |
| 13 | Witconal NP-40 | soluble | initially |
| BH | Witconal NP-80 | haze | |
| BI | Tetronic 304 | haze | |
| BJ | Tetronic 702 | haze | |
| 14 | Plurafac A-24 | soluble | initially |
| BL | Plurafac D-25 | haze | |
| BM | Pluronic 17R2 | haze | |
| BN | Pluronic 17R4 | haze | |
| BO | Pluronic L-35 | haze | |
| BP | Pluronic L-42 | haze | |
| BQ | Pluronic L-61 | haze | |
| 15 | Arlamal E | soluble | initially, then separated |
| BS | Ethofat 242/25 | haze | |
| BT | Ethosperse SL-20 | haze | |
| BU | Mazol PGO-3 | soluble | not dispersible |
| BV | Mazol PGO-104 | soluble | not dispersible |
| 16 | Brij 96 | slight haze | initially |
| 17 | Brij 56 | soluble | initially |

The catalyst emulsions which were initially water dispersible were observed over 20 hours for stability and subjected to freeze-thaw testing. The following results were observed:

| Sample | Emulsion Stability | Freeze-Thaw (16 hrs. at −15° C.) |
|---|---|---|
| 10 | creamy, separated | O.K. |
| 11 | stable at 20 hrs. | freeze through but fast thaw |
| 12 | stable at 20 hrs. | freeze through but fast thaw |
| 13 | fully separated | OK |
| 14 | stable at 20 hrs. | freeze through moderately fast thaw |
| 15 | fully separated | OK |
| 16 | stable at 20 hrs. | freeze through, slow thaw |
| 17 | stable at 20 hrs. | freeze through, slow thaw |

It can be seen from the above data that the Samples 11 and 12 have mutually soluble components and form very stable emulsions.

What is claimed is:

1. A water dispersible catalyst blend effective for promoting condensation curing of organopolysiloxanes, comprising:
   (A) 50 to 87 percent by weight of said catalyst blend of an organo tin compound selected from the group consisting of dibutyl tin dithioacetic acid ester and di(n-octyl tin S,S' bis(isooctyl mercapto acetate); and
   (B) 13 to 50 percent by weight of said catalyst blend of an emulsifier, wherein said emulsifier is selected from the group consisting of polyoxyethylene 20 sorbitan monooleate and polyoxyethylene 20 sorbitan trioleate;
   said components (A) and (B) being mutually soluble and forming a stable, high solids catalyst blend capable of remaining catalytically active after prolonged storage.

2. A catalyst blend in a water emulsion effective for promoting condensation curing of organopolysiloxanes, consisting essentially of:
   (A) 50 to 87 percent by weight of said catalyst blend of an organo tin compound selected from the group consisting of dibutyl tin dithioacetic acid ester and di(n-octyl tin S,S' bis(isooctyl mercapto acetate); and
   (B) 13 to 50 percent by weight of said catalyst blend of an emusifier, wherein said emulsifier is selected from the group consisting of polyoxyethylene 20 sorbitan monooleate and polyoxyethylene 20 sorbitan trioleate;
   said components (A) and (B) being mutually soluble and forming a stable, high solids catalyst blend capable of remaining catalytically active after prolonged storage.

* * * * *